INVENTORS
Kenneth L. Klusmier
BY Harold E. Woodrow
Russell, Chittick & Pfund
Attorneys

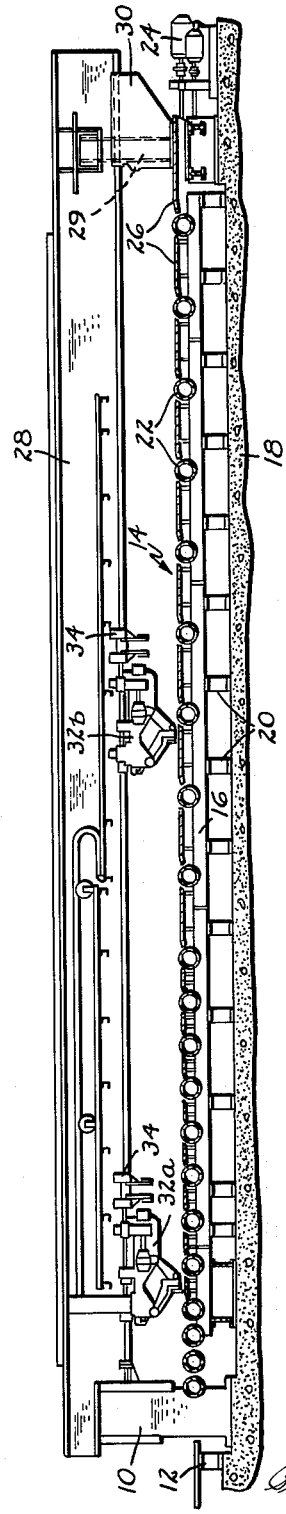

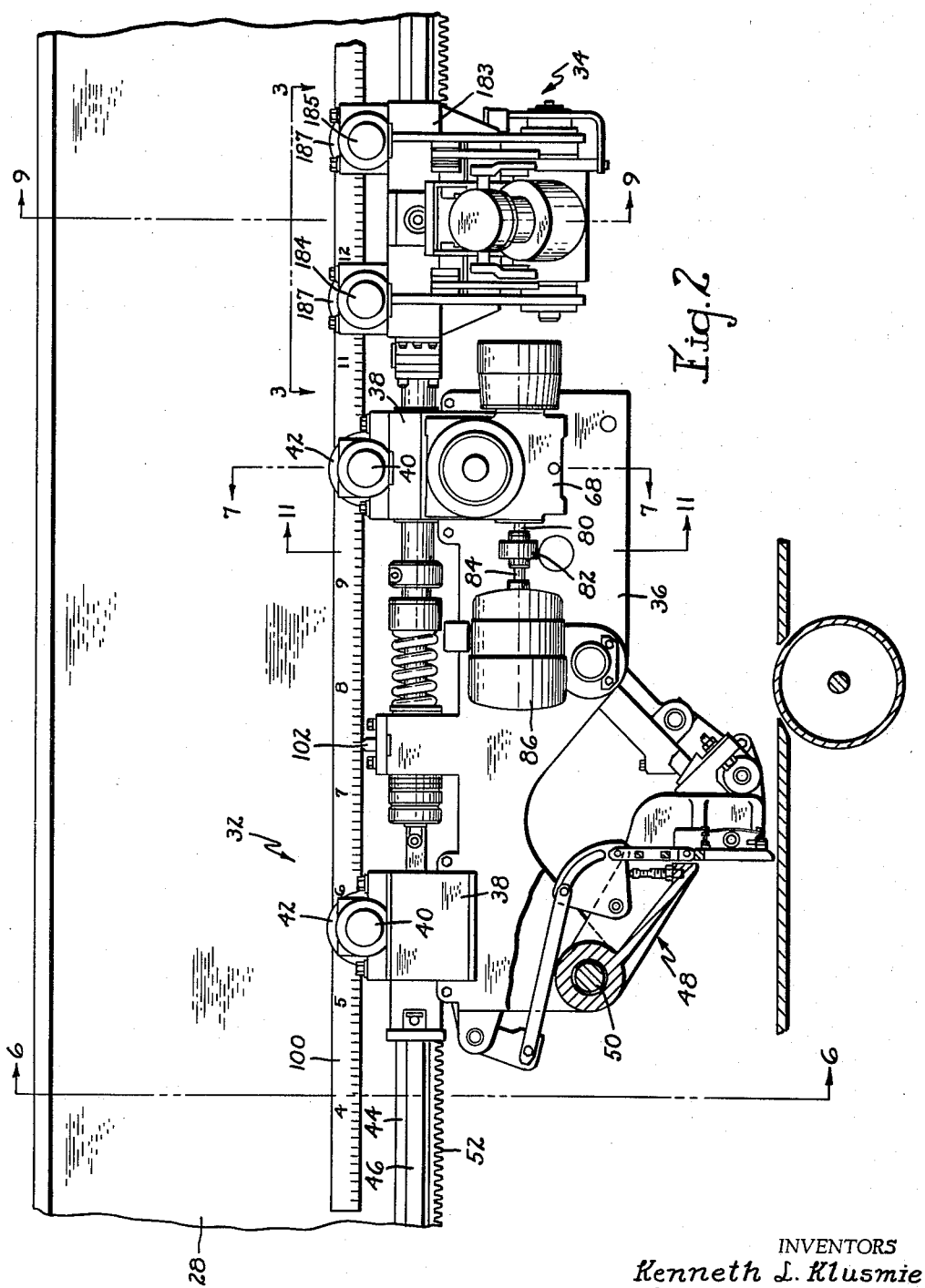

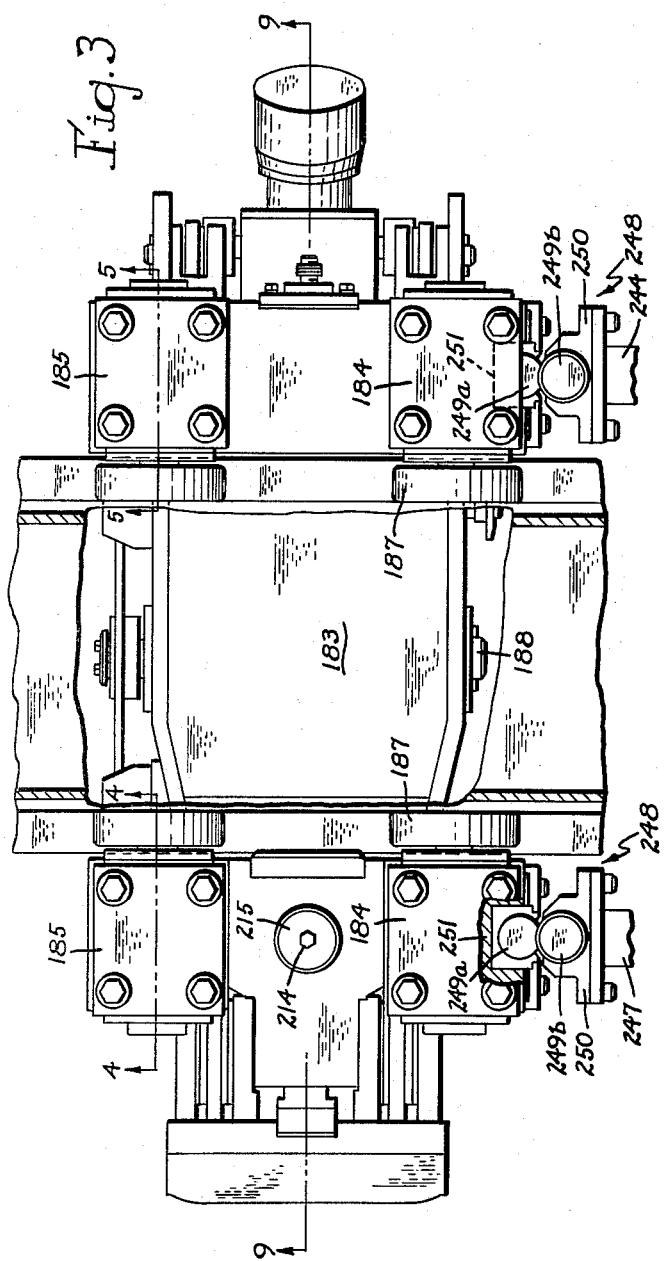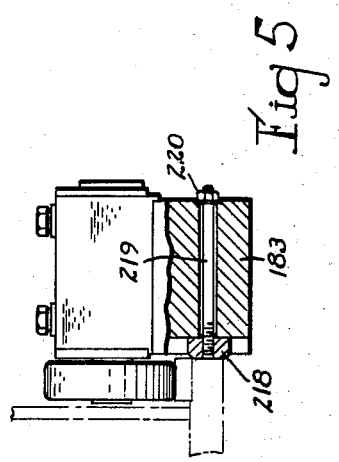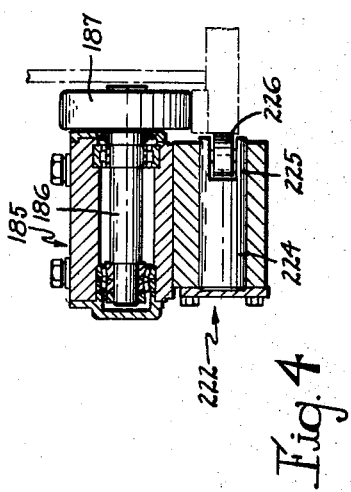
INVENTORS
Kenneth L. Klusmier
BY Harold E. Woodrow
Russell, Chittick & Pfund
Attorneys INVENTORS
Kenneth L. Klusmier
BY Harold E. Woodrow
Russell, Chittick & Pfund
Attorneys April 12, 1966  K. L. KLUSMIER ETAL  3,245,299
BACK SHEAR TABLE GAUGE Filed April 9, 1964  10 Sheets-Sheet 5

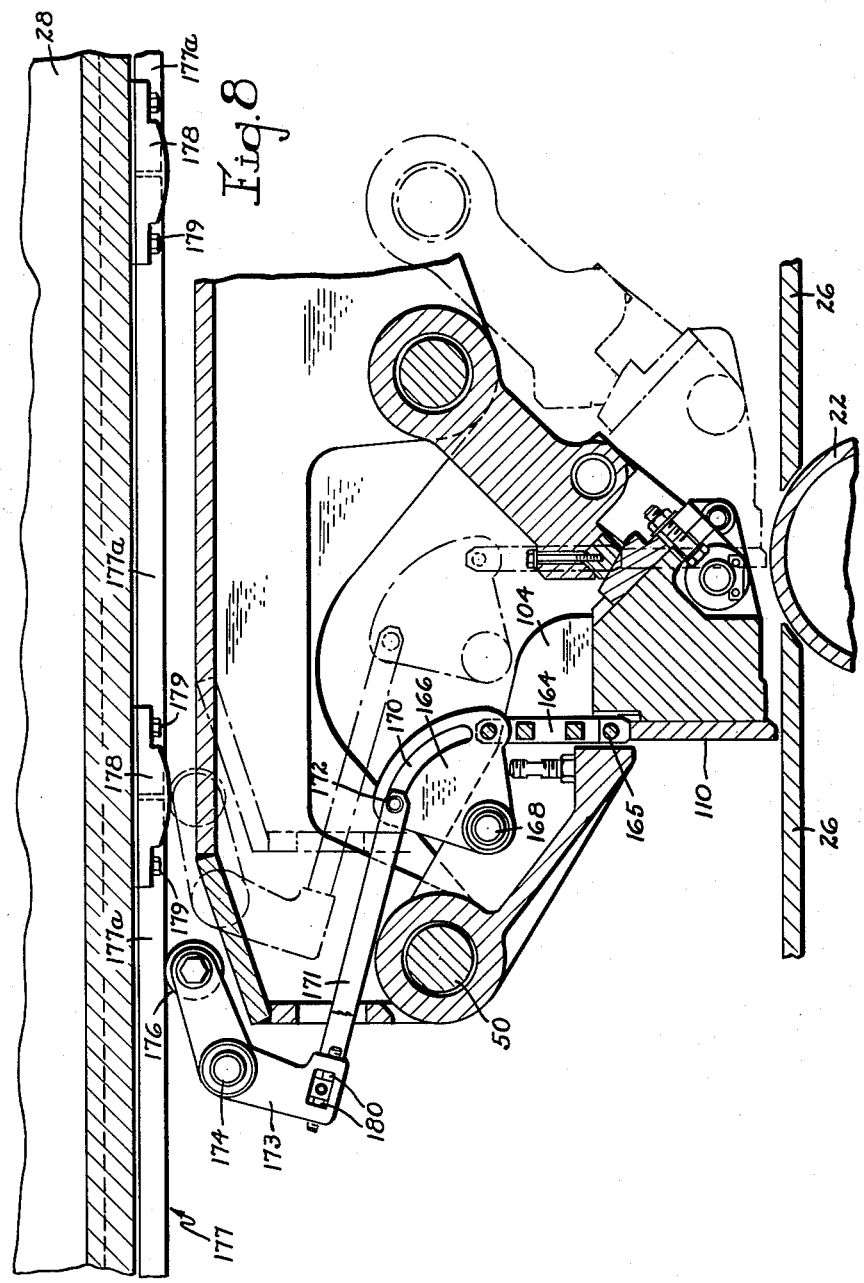

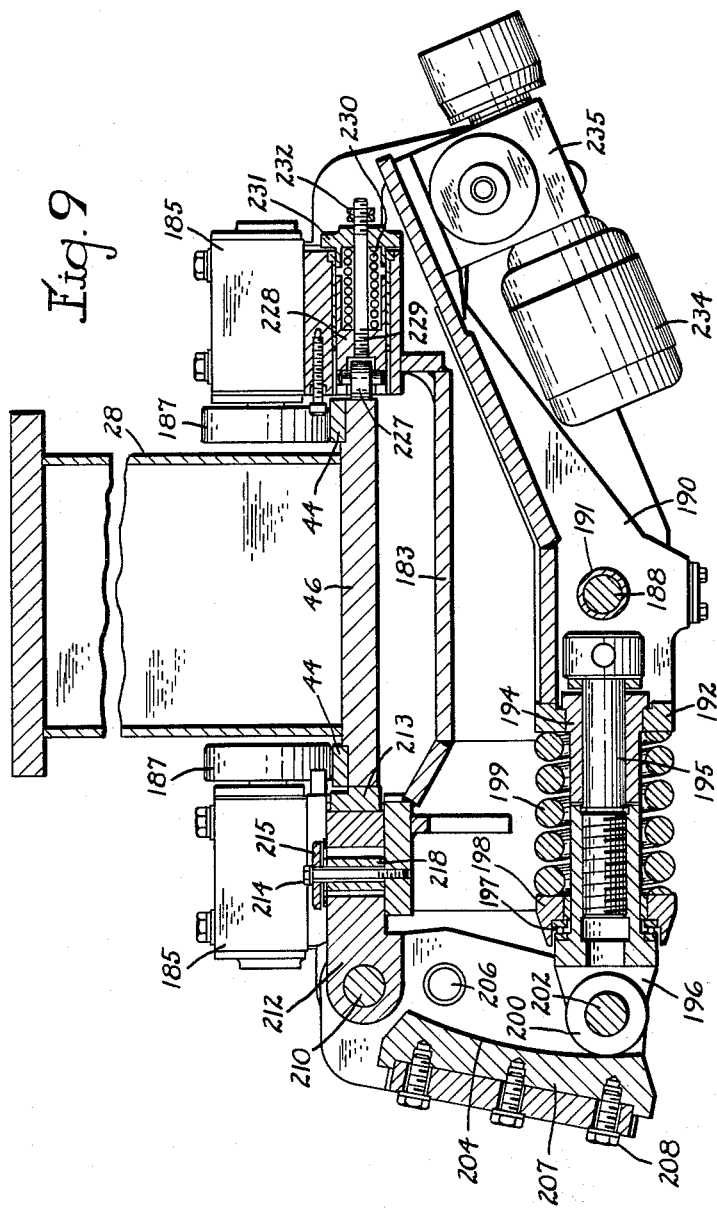

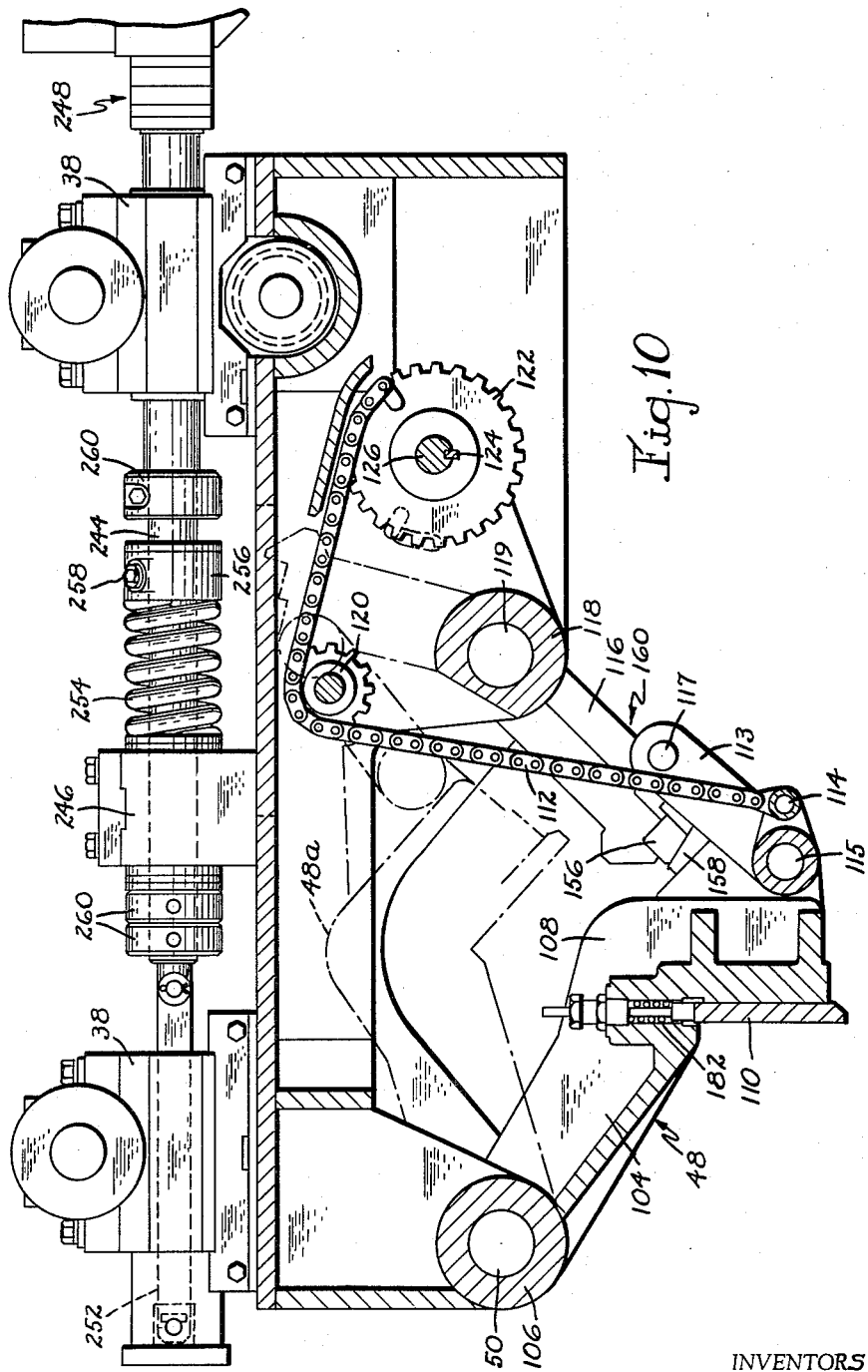

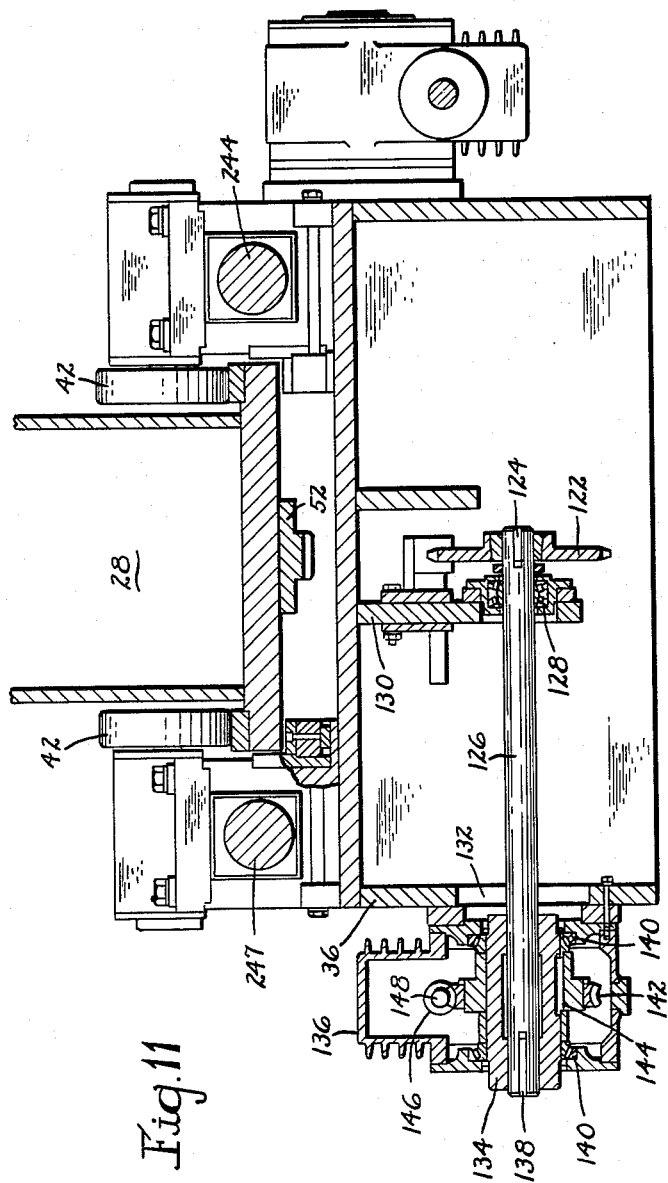

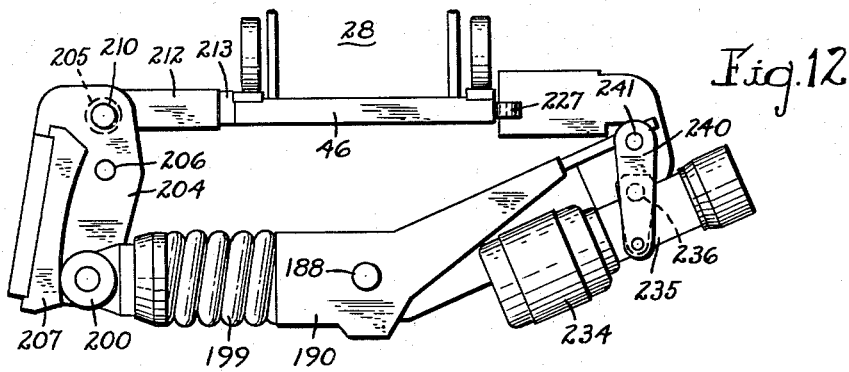
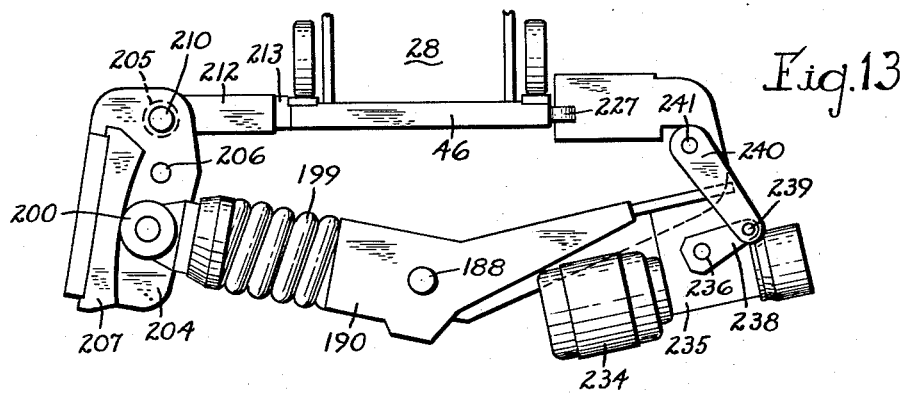
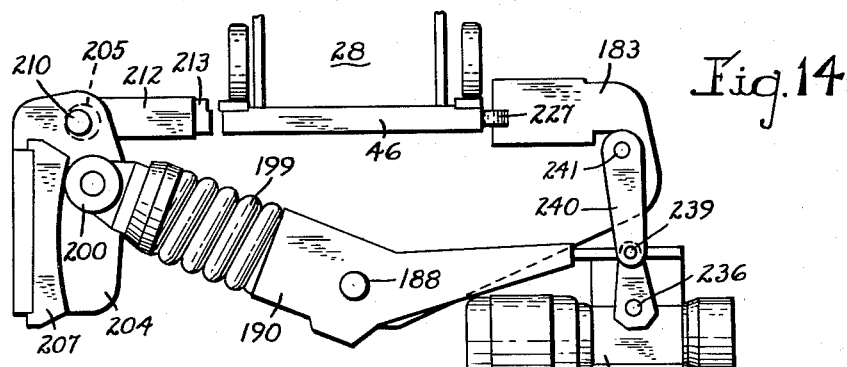
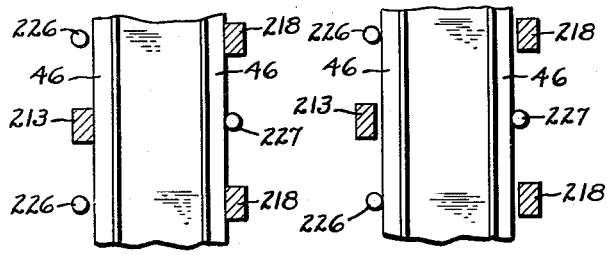

United States Patent Office 3,245,299
Patented Apr. 12, 1966

3,245,299
BACK SHEAR TABLE GAUGE
Kenneth L. Klusmier and Harold E. Woodrow, Worcester, Mass., assignors to Morgan Construction Company, Worcester, Mass., a corporation of Massachusetts
Filed Apr. 9, 1964, Ser. No. 358,549
10 Claims. (Cl. 83—269)

This invention relates to rolling mills and more particularly to an improved means of measuring and subdividing finished mill product prior to the product being bundled and stored for subsequent shipment.

In a rolling mill, stock in the form of rounds, flats, angles, etc. emerges from the final finishing stands to be transferred by suitable means to a cooling bed where it is cooled from the high temperatures developed during the rolling process. Thereafter, the stock is carried from the cooling bed by stock transfer tables and presented to a shear mechanism which operates to cut the stock into suitable lengths for subsequent storage and shipment.

In operation, the discharge end of the stock transfer table terminates at one side of the shear mechanism. A back shear table similar in construction to the stock transfer table is positioned on the other side of the shear mechanism to provide an extended supporting surface for the stock which continues downstream from the shear to a point adjacent the storage areas. Both the stock transfer table and the back shear table are provided with conventional driven table rollers spaced by intermediate apron plates. The rollers engage the stock and carry it along the length of the tables.

With this construction, stock is carried by the stock transfer table from the cooling bed towards the shear mechanism. The front ends of the stock are allowed to run past the operable range of the shear blades onto the back shear table where they ultimately engage the bumper mechanism of an adjustable back shear table gauge assembly. With this arrangement, the front end of each piece of stock coming from the cooling bed will be aligned on the back shear table by the gauge assembly at a preselected distance from the operable range of the shear mechanism. When the desired number of stock lengths have been accumulated and aligned, the shear mechanism is then operated to effectuate a cut in a direction transverse to the longitudinal axis of the tables. This in turn results in a portion being removed from each piece of stock, the length of each severed portion being equal to the distance between the shear mechanism and the bumper mechanism of the back shear table gauge assembly. Once the cutting cycle of the shear mechanism has been completed, the bumper mechanism of the back shear table gauge is moved away from the table surface to a remote inoperative position and the severed portions allowed to proceed along the back shear table to a point where they may be transferred therefrom to storage areas. The bumper mechanism is then re-positioned in an operative position and the aforementioned procedure repeated.

Thus it can be seen that the length of portions being cut from the finished product may be varied by simply adjusting the relative position of the back shear table gauge along the back shear table at selected distances from the shear mechanism. Moreover, by maintaining the gauge assembly at one position during repeated operation of the cutting mechanism, stock may be accurately subdivided into a plurality of constant length portions, a factor of considerable importance when subsequently storing and shipping finished product.

Although satisfactory in many respects, experience has shown that the back shear table gauge assemblies presently being utilized suffer from several rather serious disadvantages. More particularly, when cutting stock in the form of flats, it has frequently been found that the ends of the stock will become wedged between the bottom edge of the gauge assembly's bumper mechanisms and the apron plates of the back shear table. This is due to the fact that the driven table rollers protrude slightly above the apron plates. In order to avoid the necessity of adjusting the bumper mechanism each time the gauge assembly is moved along the back shear table, the lower edge of the bumper mechanism is cut to clear the upwardly protruding table rollers with a minimum clearance. However, during normal operation, should the bumper mechanism be positioned along the back shear table at a point overlying an apron plate, the distance between its lower edge and the upper surface of the apron plate will of necessity be greater than the desired minimum clearance. This in turn results in the aforementioned wedging of flat stock and small diameter rounds between the bumper mechanism and the apron plate as the stock is being fed onto the back shear table from the transfer table.

To avoid the problem of stock becoming wedged between the lower edge of the bumper mechanism and the apron plates, some installations have been modified to permit manual adjustment of the bumper mechanism to a point closely adjacent underlying apron plates following movement of the gauge assembly. Although this has been successful in eliminating the problem of stock becoming wedged between the bottom edge of the bumper mechanism and the apron plate, it can readily be seen that this advantage has been greatly minimized by the need to manually adjust the vertical position of the bumper mechanism before and after each movement of the gauge assembly along the back shear table.

Another disadvantage of conventional back shear table gauge assemblies is to be found in their inability to withstand the rather substantial stocks imparted thereto by the forward motion of stock being advanced from the stock transfer tables. Depending on the number of pieces being advanced from the transfer table onto the back shear table at any one time, the back shear table gauge may undergo severe shocks as the ends of the stock come into contact with the bumper mechanism. Where conventional installations are in use, this often results in serious damage to the gauge structure and its associated drive mechanisms.

Efforts have been made to avoid the aforementioned damage due to shock by combining shock absorbing means with the bumper mechanisms. However, any success achieved in preventing damage to the gauge components has been marred by resulting inaccuracies in the cuts being made on the stock. For example, many shock absorbing mechanisms comprise heavy duty coiled springs positioned to the rear of the bumper mechanim's faceplate. With this arrangement, stock strikes the faceplate and moves it back slightly as the springs absorb any shock imparted to the gauge assembly. However, once the forward motion of the stock has been arrested, the springs expand almost instantaneously with the result that the front ends of the stock are often driven back out of engagement with the faceplate. Should this occur, subsequent actuation of the shear mechanism will result in a portion being severed which is shorter in length than the distance between the shear mechanism and the faceplate of the back shear table gauge assembly.

These disadvantages have now been obviated in a novel manner by the present invention, an object of which is to provide an improved gauge means for aligning the forward ends of stock on a back shear table prior to cutting the stock into predetermined lengths.

Another object of the present invention is to provide a bumper mechanism having a vertically adjustable faceplate.

A further object of the present invention is to provide a means of automatically adjusting the vertical position of the bumper mechanism's faceplate in order to provide a relatively constant space between the lower edge thereof and the back shear table components.

Another object of the present invention is to provide a means of automatically raising and lowering said faceplate through a slight distance as the gauge assembly is moved over the upwardly protruding back shear table rollers.

Another object of the present invention is to provide an improved clamp mechanism for locking the back shear table gauge into position at any selected distance from the shear mechanism.

A further object of the present invention is to provide a means of preventing damage to the gauge assembly as the front ends of stock come into engagement with the bumper mechanism without detracting from the accuracy of the cuts being made by the shear mechanism.

Another object of the present invention is to connect the clamp mechanism to the gauge assembly by means of an improved shock absorbing means.

Another object of the present invention is to provide an improved shock absorbing means capable of cushioning the forward motion of stock striking the bumper mechanism without subsequently pushing stock out of engagement with the faceplate.

A further object of the present invention is to provide a shock absorbing mechanism having a low-cost expendible shear component associated therewith designed to fail under overloaded conditions, thereby allowing the gauge assembly to move back without serious damage thereto.

Another object of the present invention is to provide a means of immediately reactivating the shock absorbing means should the expendible shear component fail under overloaded conditions.

These and other objects of the present invention will become more apparent as the description proceeds with the aid of the accompanying drawings in which:

FIG. 1 is a view in side elevation on a reduced scale of a back shear table extending away from the shear mechanism and having associated therewith movable back shear table gauges;

FIG. 2 is an enlarged view in side elevation of a back shear table gauge and associated clamp mechanism embodying the principles of the applicants' invention;

FIG. 3 is a sectional view taken along line 3—3 of FIG. 2;

FIG. 4 is a sectional view taken along line 4—4 of FIG. 3;

FIG. 5 is a sectional view taken along line 5—5 of FIG. 3;

FIG. 8 is a sectional view taken along line 8—8 of FIG. 6;

FIG. 9 is a sectional view taken along line 9—9 of FIG. 3;

FIG. 10 is a sectional view taken along line 10—10 of FIG. 6;

FIG. 11 is a sectional view taken along line 11—11 of FIG. 2;

FIGS. 12, 13 and 14 are diagrammatic illustrations of the clamp mechanism during various stages in its operational sequence;

FIG. 15 and 16 are diagrammatic illustrations showing the clamp shoes in the locked and unlocked positions respectively.

Figure 6:
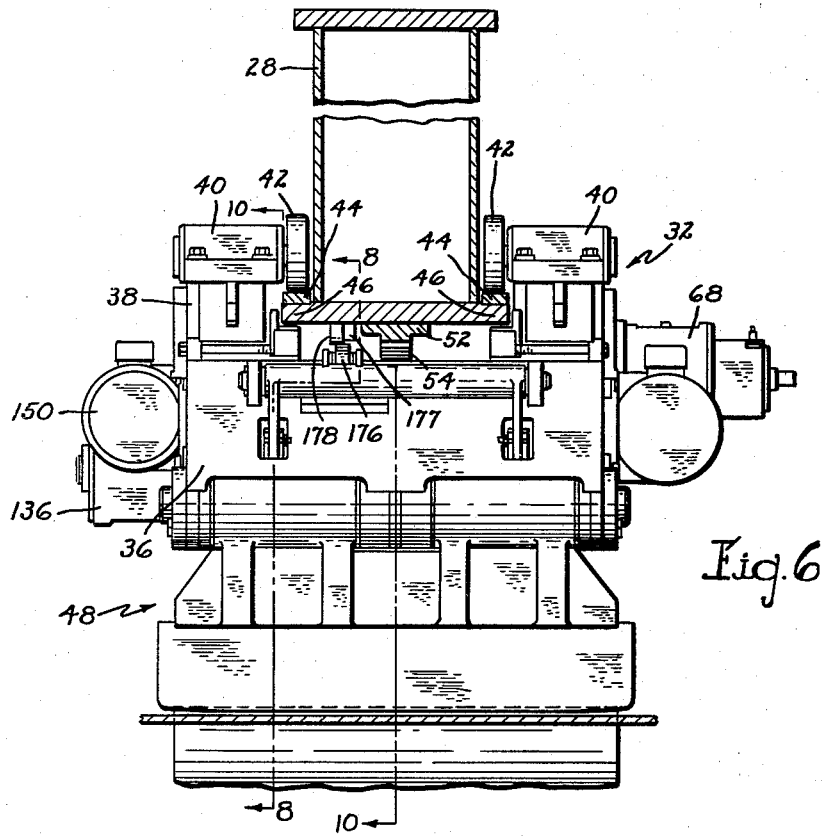
FIG. 6 is a sectional view taken along line 6—6 of FIG. 2.

Referring now to FIG. 1 wherein are best shown the general features of the invention, a shear mechanism 10 is shown positioned between the discharge end of a conventional run off table 12 and a back shear table generally indicated by the reference numeral 14. The back shear table is provided with a basic frame structure including horizontal frame members 16 supported on the mill floor 18 by means of a plurality of vertically disposed support members indicated typically by the reference numeral 20. The back shear table is also conventional in design and is provided with a plurality of horizontally disposed table rollers indicated typically by the reference numeral 22, the rollers being driven in a clockwise direction as viewed in FIG. 1 by means of drive motor 24 operating through suitable gears and drive shafts (not shown). Rollers 22 are positioned at intervals along the length of back shear table 14 and are spaced by intermediate apron plates 26 which cooperate with the rollers in providing a continuous surface over which stock may be displaced. Since the surface of each roller protrudes slightly above the intermediate apron plates, stock supported thereon will be driven from left to right as viewed in FIG. 1 upon operation of drive motor 24.

An elongated gauge supporting beam 28 overlies the entire length of back shear table 14 and extends in parallel relationship thereto. Beam 28 is supported at one end by the housing structure of shear mechanism 10 and at its other end by a beam support 29. A fixed stop 30 is also positioned adjacent beam support 29 to prevent further movement of stock along back shear table 14.

Depending downwardly from gauge supporting beam 28 and movably mounted thereon are back shear table gauge assemblies generally referred to by the reference numeral 32 and individually indicated in the drawings by 32a and 32b. As will hereinafter be more fully described, each gauge assembly is provided with a clamp mechanism 34 connected thereto by intermediate shock absorbing means.

In general operation, elongated pieces of finished stock having varying cross-sectional configurations in the form of angles, rounds or flats, depending on the current product being rolled by the mill, are taken from the cooling bed and placed on the runoff table 12 where they are carried towards the shear mechanism 10. The front ends of the stock are allowed to run past the operative range of the shear blades until engaged by one of the gauge assemblies 32. As shown in FIG. 1, forward motion of the stock would be arrested by gauge assembly 32a. After several pieces of stock have been accumulated and aligned in the aforementioned manner, the shear mechanism 10 is operated through a cutting cycle with the result that a portion is severed from each piece. In this manner, each severed portion will have a length corresponding to the preselected distance between the shear mechanism 10 and gauge assembly 32a. As will hereinafter be more fully described, the severed portions are then either deposited in an underlying crop bin or carried along the back shear table to a point where they may be transferred to an adjacent area for bundling and storage.

Referring now to the remainder of the figures with initial reference to FIGS. 2 and 6, a gauge assembly 32 is shown movably mounted in a depending position on gauge supporting beam 28. The gauge assembly is comprised basically of a carriage type housing 36 having vertically disposed extensions 38 extending upwardly therefrom. Bearings 40 are mounted on the upper supporting surfaces of extensions 38 to provide a means of journalling rotatable shafts having rollers 42 fixed to the inner ends thereof. Rollers 42 are designed to run along horizontal tracks 44 attached to the outwardly disposed lower flanges 46 of supporting beam 28.

Gauge assembly 32 further includes a depending bumper mechanism generally indicated by the reference numeral 48 which is pivotally mounted to the carriage-type housing 36 by means of a pivotal shaft 50 extending horizontally therethrough. The bumper mechanism presents an obstruction to the movement of stock along the back shear table when lowered to an operative position as illustrated in FIG. 2. In view of the above, it becomes apparent that by displacing the gauge assembly 32 along beam 28 through the cooperative action of rollers 42 running on tracks 44, the relative position of the depending bumper mechanism 48 with respect to the shear mechanism 10 can be quickly and easily adjusted in order to vary the lengths of portions being severed from the finished lengths of stock.

The motor driven traverse drive which provides the means of driving gauge assembly 32 along support beam 28 will now be described with particular reference to FIGS. 2, 6 and 7. A longitudinal gear rack 52 is attached to the undersurface of beam 28 and extends the entire length thereof. A pinion gear 54 meshes with gear rack 52 and is keyed to one end of the traverse drive shaft 56 by means of key 58. Drive shaft 56 is rotatably contained within a passageway extending axially through a subtsantially tubular drive shaft housing 60 in turn fixed to interior structural members of the carriage housing 36. Annular radial and thrust bearing assemblies 62 and 64 are positioned between drive shaft 56 and drive shaft housing 60 to facilitate rotation of the former within the latter.

Drive shaft housing 60 is further provided with radially extending outer flange 66 to which is attached a gear reducer 68 by means of bolts indicated typically at 70. Gear reducer 68 is provided internally with a rotatable hollow shaft 72 on which is keyed a worm gear 74 by means of key 76. Worm gear 76 meshes with worm 78 forming an integral part of transversally extending shaft 80. Shaft 80 extends through the gear reducer housing to be connected by means of coupling 82 to the output shaft 84 of traverse drive motor 86 (see FIG. 2). With this arrangement, it can be seen that operation of traverse drive motor 86 will result in torque being transmitted through shafts 84 and 80 and gears 78 and 80 to the rotatable hollow shaft 72.

Hollow shaft 72 is journalled between annular thrust bearings 88 for rotation within gear reducer 68 and being hollow, provides an axial passageway 69 through which one end of traverse drive shaft 56 extends. A magnetic clutch assembly generally indicated by the reference numeral 90 is attached to gear reducer 68 by means of bolts indicated typically at 92 to provide a means of transferring torque from rotating shaft 72 to the traverse drive shaft 56. Clutch assembly 90 is comprised basically of an annular drive plate 93 fixed to the end of rotatable hollow shaft 72 and an adjacent annular clutch plate 94 keyed to traverse drive shaft 56 by means of a key 95 extending through a keyway in the drive shaft. Both plates 93 and 94 are provided with opositely disposed recesses within which are located inwardly disposed ring gears 96 and 97. A circular drive gear 98 having teeth designed to mesh with either ring gear 96 or 97 is slidably mounted on shaft 56 and as shown in FIG. 7, is located within the recess of drive plate 93 in meshed engagement with ring gear 97 when the clutch is in a disengaged position. The gear is held in this position when the clutch is disengaged by small tension springs 99. With the aforementioned clutch components so arranged, hollow shaft 72 may rotate without transferring torque to traverse drive shaft 56.

Figure 7:
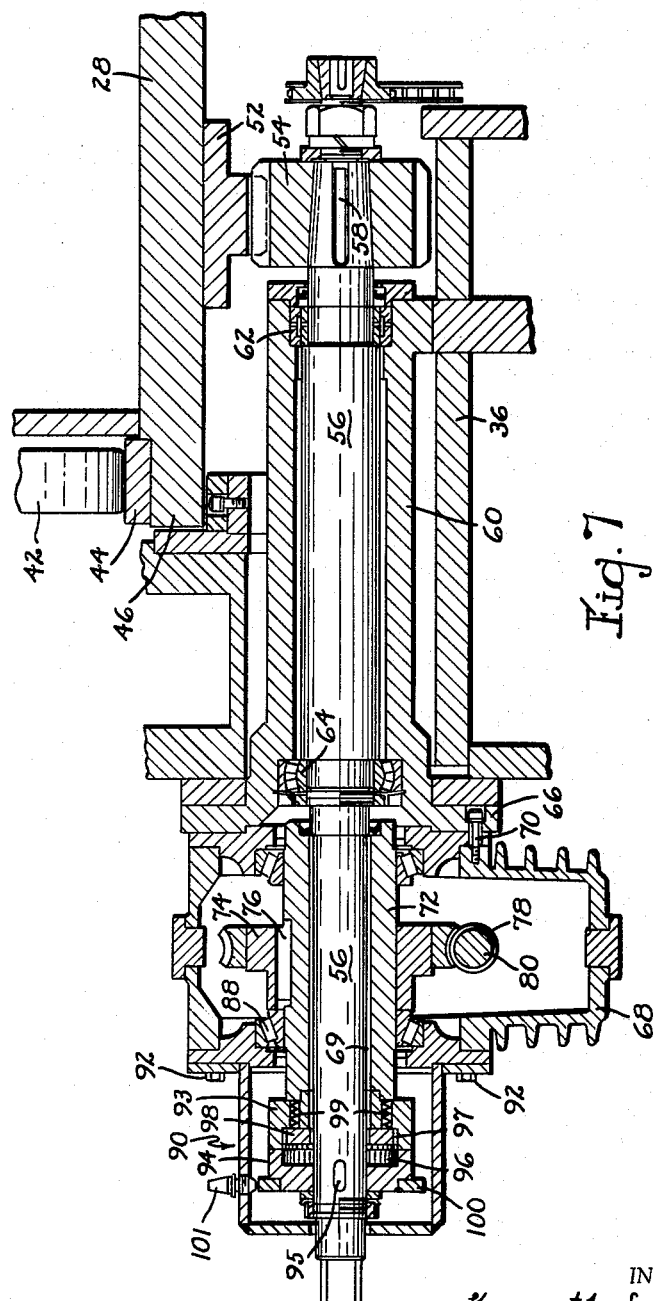
FIG. 7 is a sectional view taken along line 7—7 of FIG. 2.

As can further be seen in FIGURE 7, clutch plate 94 is provided with a circular radially disposed brush member 100 frictionally contacted by brush holder 101 which is in turn electrically connected to a remote power source. When placing clutch assembly 90 in operative engagement, electric current is supplied to clutch plate 94 through brush holder 101 and brush 100. This results in drive gear 98 being pulled to the left as viewed in FIGURE 7 into additional engagement with the clutch plate's ring gear 96. With drive gear 98 in meshed engagement with both ring gears 96 and 97, torque is readily transmitted from the rotating hollow shaft 72 to traverse drive shaft 56. When clutch plate 94 is de-energized the increased tension developed in springs 99 takes effect to pull drive gear 98 back into the recess of drive plate 93 and out of engagement with the clutch plate's ring gear 96, thereby resulting in disengagement of clutch assembly 90.

In actual operation, both traverse drive motor 86 and clutch assembly 90 are energized simultaneously. In this manner, power is transmitted through gear reducer 68 to traverse drive shaft 56 in order to drive pinion gear 54. This in turn results in the carriage assembly being displaced along the length of gauge supporting beam 28 due to the positive mechanical engagement between pinion gear 54 and gear rack 52. By reversing traverse drive motor 86, displacement of the gauge assembly may also be reversed. This in turn permits movement of gauge assembly 32 along supporting beam 28 in a direction towards or away from the shear mechanism 10.

As shown in FIG. 2, supporting beam 28 is further provided along one side with a scale 102 indicating the measured distance at any point along the beam from the shear mechanism 10. A point indicator 103 extends upwardly from the carriage housing 36 to provide a means of visually determining distance between the gauge assembly 32 and shear mechanism 10. This visual distance indicating system supplements a conventional Selsyn operated position indicator (not shown) which enables an operator to control the positioning of the gauge assembly from a remotely located operating area.

Having thus described the traverse drive mechanism, the description will now proceed with particular reference to FIGS. 6, 10 and 11 wherein is illustrated the means for pivotally raising the bumper mechanism 48 about pivotal shaft 50 from a lowered operative position as shown in the drawings to a raised inoperative position. As can be best seen in FIG. 10, bumper mechanism 48 is comprised basically of a pivotal member 104 terminating at its upper end in a tubular collar 106 mounted on pivotal shaft 50 for pivotal displacement in relation thereto. The vertically depending lower portion 108 of pivotal member 104 is further provided with the slidable bumper plate 110, the operation of which will hereinafter be more fully described. Motion is imparted to member 104 about shaft 50 by means of a lift chain 112 pivotally attached at its lower end to link member 113 as at 114. Link member 113 is in turn pivotally attached to the lower portion 108 of pivotal member 104 by pin 115.

The upper portion of link member 113 is provided with a clevis-type construction pivotally connected to an upper link 116 by means of pin 117. The other end of upper link member 116 terminates in a collar 118 pivotally attached by means of shaft 119 to the inner frame structure of carriage housing 36. Chain 112 extends upwardly over an idler sprocket 120 and is thereafter engaged to a driven sprocket 122.

As can be best seen in FIG. 11, driven sprocket 122 is keyed as at 124 to a drive shaft 126 journalled at a point adjacent the driven sprocket within a bearing 128 mounted on a depending bracket 130. The other end of drive shaft 126 extends through an aperture 132 in the side of housing 36 and is keyed within the rotating hollow shaft 134 of gear reducer 136 by means of key 138. Hollow shaft 134 is journalled for rotation within the outer casing of reducer 136 by means of bearings 140 and is provided with a circumferentially disposed worm gear 142 keyed thereto by means of key 144. Worm gear 142 is driven by a worm 146 integral with the output shaft 148 of bumper lift motor 150 (see FIG. 6). Thus it can be seen that through the operation of bumper lift motor 150, the bumper mechanism 48 may be pivoted about shaft 50 from a lowered operative position adjacent the upper surface of back shear table 14 to a raised inoperative position as indicated at 48a by the plantom lines in FIG. 10. By reversing motor 150, the bumper mechanism 48 will of course be lowered to its operative position.

It should also be understood that when lowered to an operative position, bumper mechanism 48 is locked into place by means of upper link member 116 acting as a backup arm. More specifically, the lower end of link 116 terminates in a replaceable shoe 156 having an angularly cut face designed to frictionally engage a wedge-shaped wear plate 158 adjustably mounted on the rear side of pivotal member 104. It should now be apparent that links 113 and 116 combine to form a toggle strut hereinafter referred to by the reference numeral 160. When bumper mechanism 48 is in a downwardly disposed operative position as indicated in FIG. 10, the "knee" of toggle strut 160 coinciding with the axis of pivot pin 117 is depressed to a locked position below an imaginary line connecting the axes of pivot pin 115 and shaft 119. This in turn results in shoe 156 being frictionally engaged against wear plate 158. The degree to which the knee of toggle strut 160 is depressed is controlled by adjusting the position of wedge-shaped wear plate 158. With this construction, the bumper mechanism is prevented from swinging up about pivotal shaft 50 as the front ends of stock coming from the runoff table collide with bumper plate 110.

When bumper mechanism 48 is raised by placing chain 112 in tension, link 113 will be pivoted in a counterclockwise direction about pivot pin 115, causing a corresponding counterclockwise rotation of pivot pin 117 about the same point. Since pivot pin 117 represents the knee of toggle strut 160, the counterclockwise rotation about pin 115 will unlock the strut and disengage shoe 156 from wedge-shaped wear plate 158.

Having thus described the means for raising the bumper mechanism 48 from a downwardly disposed operative position to a remote inoperative position, the description will now proceed with particular referecne to FIG. 8 wherein is disclosed the cam follower means for automatically adjusting the vertical position of slidable bumper plate 110 in order to maintain a relatively constant minimum distance between the lower edge thereof and the apron plates 26 and rollers 22 comprising the supporting surface of the back shear table 14. As previously indicated, bumper plate 110 is slidably mounted on the forward face of pivotal member 104 for vertical displacement in relation thereto. The lower portion of a lower intermediate link member 164 is attached to the upper edge of bumper plate 110 by means of a transversely extending pin 165, its upper extremity in turn being pivotally connected by a similar pin to a bell crank 166. Bell crank 166 is pivoted as at 168 to pivotal member 104 and is provided adjacent its peripheral edge with an arculate slot 170. An upper intermediate link 171 is pivotally connected at one end to bell crank by means of a pin 172 slidably engaged within slot 170, its other end being fixed to an angularly shaped follower arm 173 pivotally connected at its intermediate portion to the carriage housing as at 174. The upper end of follower arms 173 is provided with a cam roller 176 designed to engage either a cam rail generally referred to by the reference numeral 177 or individual cams 178 bolted to the undersurface of supporting beam 28 by means of bolts indicated typically at 179. The cam rail is also bolted to the undersurface of beam 28 and is made up of individual sections 177a which abut at points adjacent the individual cams 178. The positional relationship of the cam rail 177 to the individual cams is further illustrated in FIG. 8 where it can be seen that roller 176 is provided with sufficient width to contact either the rail or the cams as it moves along beam 28 with the gauge mechanism.

It should be understood that the undersurface of cam rail 177 extends over the length of the back shear table at a fixed vertical distance from the underlying apron plates 26. Where an apron plate is slightly bent out of shape, shims (not shown) can be inserted between the undersurface of beam 28 and the cam rail to compensate for these irregularities and thereby maintain the aforementioned fixed vertical distance.

As indicated by the phantom lines in FIG. 8, movement of the carriage assembly from left to right over a table roller 22 will result in cam roller 176 being depressed from cam rail 177 onto cam 178. This in turn will cause cam follower arm 173 to be pivoted about point 174 with a resultant upward pull being exerted on upper intermediate link 171. With pin 172 initially positioned at the upper end of arcuate slot 170, any upward pull on link 171 will result in bell crank 166 being pivoted about point 168. This in turn will cause the slidably mounted bumper plate 110 to be raised through a distance roughly corresponding to the angular displacement of member 166. However, should the bumper mechanism 48 be raised to an inoperative position as previously discussed, bell crank 166 will be angularly displaced about shaft 50 along with pivotal member 104. When this occurs, pin 172 will slide downwardly within arcuate slot 170, thereby avoiding any unnecessary disturbance of the cam follower arm 173.

It should of course be understood that a plurality of individual cams 178 are affixed to the undersurface of support beam 28 along its entire length, the total number of cams being equal to the number of back shear table rollers. Each cam is properly positioned to be engaged by roller 176 as bumper plate 110 begins to pass over an underlying table roller 22. With this construction, the lower edge of the bumper plate will be raised slightly as it passes over each upwardly protruding table roller and thereafter lowered as the bumper plate passes over the intermediate apron plates 26.

The desired clearance to be maintained between the lower edge of bumper plate 110 and the back shear table components may be further adjusted by manually setting adjustment screws 180 prior to operation of the apparatus. It should also be noted (see FIG. 10) that the bumper plate 110 is constantly urged to its lowest position by means of compressed spring members 182 acting on its upper edge. In view of the above, it can be seen that the vertical displacement of slidable bumper plate 110 will automatically be controlled as the carriage assembly moves along support beam 28 in order to maintain any desired preset clearance between the lower edge thereof and the underlying apron plates 26 and table rollers 22. By providing such an arrangement, the possibility of stock becoming wedged between the apron plates and the lower edge of the bumper plate is completely avoided without the need of resetting the bumper plate each time the gauge assembly is moved.

Having thus described the principal components of gauge assembly 32, the specification will now proceed with a description of the clamp mechanism 34 and intermediate shock absorbing means associated therewith. As can be best seen in FIG. 2, the clamp mechanism generally referred to by the reference numeral 34 is positioned to the rear of gauge assembly 32 and is connected thereto by intermediate shock absorbing means, a description of which will hereinafter be provided. As shown in FIG. 3, the clamp mechanism is provided with a basic housing structure 183 having mounted on its upper surface front and rear bearing assemblies 184 and 185. As can be best seen in FIG. 4, each bearing assembly is internally provided with a suitably journalled rotatable shaft 186 having mounted on its inner exposed end a clamp support roller 187. The clamp support rollers 187 are designed to ride along tracks 44 as are the support rollers 42 of the gauge assembly 32.

As can be best seen in FIG. 9, clamp mechanism 34 is internally provided with a rocker arm 190 suitably journalled for rotation on a rocker arm shaft 188 by means of a sleeve bearing 191. Rocker arm 190 terminates at its left end as viewed in FIG. 9. In an annular collar 192 having inserted therein a cylindrical screw guide 194. A tension adjusting screw 195 extends axially through screw guide 194 with its other end threaded within a clevis member 196. Thrust bearing 197 is positioned intermediate the end portion of clevis member 196 and a spring retaining collar 198 with a heavy duty coiled spring 199 in turn held in compression between collars 192 and 198. Clevis member 196 provides a means of mounting roller bearing 200 on a rotatable pin extending transversely therethrough.

A clamp lever 204 is pivotally mounted on the clamp housing structure 183 to the left of rocker arm 190 by means of a pivot pin 206. Lever 204 is further provided with a radius track 207 attached to the inner surface thereof by means of bolts indicated typically at 208. This arrangement results in the curved inner face of radius track 207 being engaged by roller bearing 200.

The upper end of clamp lever 204 is in turn pivotally connected by means of a second pivot pin 210 to a horizontally disposed shoe link 212 slidably mounted on the clamp housing structure 183 for movement in a direction transverse to the longitudinal axis of support beam 28. Shoe link 212 is provided at its inner extremity with a clamp shoe 213 and is slidably held on housing 183 by means of a retaining screw 214 and cap 215 spaced from the housing by means of a tubular spacer 216.

On the right side of the clamp housing as viewed in FIG. 9 beneath both the front and rear wheel bearing assemblies 184 and 185 are positioned fixed clamp shoes indicated in FIG. 5 by the reference numeral 218. The fixed clamp shoes are held in place by means of screws 219 having one end threaded therein. Screws 219 extend through the clamp housing 183 and are engaged at the other end by nuts 220. As can be seen by a comparison of FIGS. 5 and 9, the fixed clamp shoes 218 and the movable clamp shoe 213 mounted on shoe link 212 are all designed to engage the outer edges of lower beam flange 46.

The basic operational sequence of the clamp mechanism will now be described with additional reference to the diagrammatic illustrations contained in FIGS. 12 to 16. When initially placing roller bearing 200 within the radius of track 207, tension adjusting screw 195 is tightened to effectuate maximum compression of spring 199 between collars 192 and 198. Thereafter, screw 195 is loosened in order to allow spring 199 to expand. This in turn results in the compressive force of the spring being exerted through radius track 207 on clamp lever 204.

As shown in FIGS. 14 and 16, the clamp mechanism is adjusted to the unclamped position with clamp shoes 213 and 218 disengaged from the edges of lower beam flange 46. This is accomplished by rotating rocker arm 190 about shaft 188 until the rotational axis of roller bearing 200 coincides with that of pivot pin 206. When so adjusted, the force being exerted by compressed spring 199 is applied through roller bearing 200 to lever 204 through the axis of pivot pin 206, thus having no further turning influence on lever 204. The unbalanced weight of lever 204 causes itself to be rotated in a counterclockwise direction about pin 206 until pin 210 contacts edge of hole 205 in structure 183 and results in movable brake shoe 213 being moved out of contact with the adjacent beam flange 46.

The clamping mechanism is actuated by rotating rocker arm 190 about shaft 188 in a counterclockwise direction. By so doing, the effective force of spring 199 applied through roller bearing 200 is displaced below pivot pin 206 and acts against the inner radius of track 207. This in turn produces a lever action about pivot pin 206 tending to push slidable link 212 with movable clamp shoe 213 mounted thereon towards the edge of lower beam flange 46. As the counterclockwise rotational displacement of rocker arm 190 increases, the vertical distance between roller bearing 200 and pivot pin 206 is also increased. This in turn produces a greater lever action about pivot pin 206 tending to exert a correspondingly greater clamping force on clamp shoe 213.

In the drawings, an intermediate operative position of the clamp mechanism has been illustrated in FIG. 13 wherein roller bearing 200 has been displaced to approximately the midpoint of track 207. As shown in FIG. 12, roller bearing 200 has reached the lower end of track 207. At this point, a maximum effective clamping force is being exerted through lever 204 and shoe link 212 on clamp shoe 213. When in the fully clamped position resulting from rotation of rocker arm 190 to a position as indicated in FIG. 12, it should be understood that the entire clamp mechanism 34 will be shifted slightly to the left on tracks 44 as viewed in FIG. 9. This is due to the fact that the movable clamp shoe 213 is opposed by fixed clamp shoes 218, all clamp shoes being initially spaced from the edges of beam flanges 46 when in the unclamped position. Consequently, as the clamping force is applied to force movable brake shoe 213 against beam flange 46 positioned adjacent thereto, the entire clamp mechanism will be laterally displaced on tracks 44 until the fixed clamp shoes 218 come into contact with the opposite edge of the beam flange.

In view of the above, it can be seen that an ever increasing clamping force will be transferred through lever arm 204 to the clamp shoes by rotating rocker arm 190 about shaft 188. In so doing, both the torque required to rotate arm 190 and the force exerted by spring 199 will remain relatively constant, the increase in clamping force being due solely to the lever action afforded by arm 204.

Clamping mechanism 34 is further provided with a means for insuring the disengagement of the clamp shoes from the lower beam flange 46 when rocker arm 190 is rotated in a clockwise direction back to the unclamped position as shown in FIG. 14. More particularly, side roller assemblies generally indicated by the reference numeral 222 in FIG. 4 are positioned within the clamp housing on the left side of the apparatus as viewed in FIG. 3. These roller assemblies are comprised basically of roller support shafts 224 terminating at their inner extremities in clevis portions 225 within which are mounted side rollers 226.

As shown in FIG. 9, the opposite side of the apparatus is provided with a single side roller 227 rotatably contained within a clevis 228 having threaded therein one end of pin 229. Clevis 228 is further provided with an inner tubular passageway containing coiled spring 230. The spring is compressed by the cooperative action of spring retainer 231 and lock nut 232 threaded to the exposed end of pin 229. With this arrangement, it can be seen that the single side roller 227 is continuously forced against the adjacent edge of lower beam flange 46 under a force developed by compressed spring 230.

The above-described side roller arrangement cooperates with the brake shoes in the following manner; as previously described, during the clamping cycle, the movable clamp shoe 213 is pushed against the adjacent edge of lower beam flange 46, the entire clamp assembly being slightly displaced laterally on tracks 44 until the fixed clamp shoes 218 engage the opposite edge of flange 46 (compare the relative position of the clamp support wheels 187 in FIGURES 13 and 14). During this lateral shifting, roller spring 230 will be further compressed between clevis member 228 and spring retainer 231 as the single side roller 227 is pushed back into a withdrawn position within the housing structure. When the fully clamped position is reached as indicated diagrammatically in FIG. 15, side roller 227 will be withdrawn to a point in alignment with the operative faces of fixed clamp shoes 218. However, as the clamp assembly is unlocked and movable clamp shoe 213 withdrawn, side roller 227 will emerge from its withdrawn position under the influence of expanding spring 230. This will result in the fixed clamp shoes 218 being disengaged as the lower beam flange 46 is engaged between rollers 226 on one side and roller 227 on the other. When the unclamped position has finally been reached, the respective position of the clamp shoes and side rollers will be as indicated diagrammatically in FIG. 16, clamp shoe 213 then having been withdrawn under the force of spring 199 as previously described to a point behind side rollers 226. When so adjusted, the clamp mechanism can be displaced along longitudinal support beam on tracks 44 without fear of the clamp shoes being dragged along the outer edges of lower flange 46.

The means utilized in rotating rocker arm 190 about shaft 188 will now be described. As indicated in FIG. 9, a gear motor 234 is operatively connected to a reducer 235 which is in turn mounted in a depending position to one end of rocker arm 190. As can be best seen in FIGS. 12 to 14, the reducer is provided with an output shaft 236 terminating in a crank arm 238 keyed for rotation therewith. Crank arm 238 is in turn pivotally connected at its upper end as at 239 to an intermediate link member 240. Link member 240 is pivotally connected at its upper end as at 241 to the clamp housing 183. By comparing FIGS. 12, 13 and 14, it can readily be seen that as output shaft 236 is rotated in a clockwise direction under the influence of gear motor 234 operating through reducer 235, crank arm 238 will also be rotated in a clockwise direction. This will in turn cause the toggle assembly comprised of crank arm 238 and link 241 to gradually collapse with the results that the rocker arm 190 will be rotated to the clamp position in a counterclockwise direction about shaft 188. Unclamping will be effectuated in a similar but reversed manner by simply reversing the rotational direction of output shaft 236.

Having thus described the principal components of the clamping mechanism 34 and its operational sequence, the shock absorbing means employed to connect the clamp mechanism to the gauge assembly 32 will now be described. Referring initially to FIG 10, a shock absorbing shaft 244 is shown slidably extending through the vertically disposed extensions 38 and pedestal 246 of the gauge assembly's carriage-type housing 36. It should be noted at this time that a second shaft 247 (see FIG. 11) extends slidably through the other side of the gauge assembly and is provided with associated shock absorbing components identical to those to be presently described in connection with shaft 244.

As shown in FIG. 3, the rear ends of shafts 244 and 247 are attached to clamp housing 183 by means of pivotal connections generally indicated by the reference numeral 248. The pivotal connections are comprised basically of two cylindrical pins 249a and 249b rigidly interconnected to form adjacent pivot points. Pins 249b are pivotally contained within flanged sockets 250 which are in turn connected to the ends of shock absorbing shafts 244 and 247. In a similar manner, pins 249a are pivotally contained within oppositely disposed sockets 251 integrally contained within front wheel bearing assemblies 184. With this arrangement, clamp assembly 34 may shift laterally on tracks 44 during the clamping operation as previously described without effecting the relative position of the gauge assembly 32 which will remain stationary throughout the clamping and in clamping cycles.

Because of the identical construction of the shock absorbing components associated with both shafts 244 and 247, the description will now proceed with reference only to those components associated with shaft 244. As shown in FIG. 10, the forward end of shaft 244 is operatively connected to a hydraulic dashpot 252 in turn secured to the carriage housing 36. A coiled shock absorbing spring 254 is positioned on shaft 244 between pedestal 246 and a spring retaining collar 256. Collar 256 is held in position on shaft 244 by means of a shear pin 258 extending transversely through both the collar and the shaft. A backup collar 260 is also fixed on shaft 244 and is spaced to the rear of spring retainer collar 246. In operation, the shock absorbing system reacts as follows: as the ends of stock move along the back shear table and come into contact with the slidable bumper plate 110 of bumper mechanism 48, a considerable shock is imparted to the entire gauge assembly 32 which is being held in place on the support beam 28 by means of the clamp mechanism 34. When this occurs, the entire gauge assembly 32 will be allowed to move back slightly as each coiled shock absorbing spring 254 is compressed between pedestal 246 and spring retaining collar 256. Once the shock absorbing springs 254 have absorbed the kinetic energy imparted to the gauge assembly by the oncoming pieces of stock, they will be permitted to expand and force the gauge assembly back to its original position. The expansion of springs 254 will be retarded by dashpots 252 operable to retard any motion of the gauge in a direction away from the clamp mechanism 34. The action of the dashpots will therefore avoid any bouncing action tending to push the stock in a reverse direction out of contact with bumper plate 110.

Should careless operation result in an excessive shock being imparted to the gauge assembly, serious damage to the drive components will be avoided by allowing the shear pin 258 to shear at a predetermined safe load level. This will result in spring retaining collar 256 being driven back until engaged by backup 260. By allowing the spring retaining collar to move back slightly, shock absorbing spring 254 will temporarily expand and in effect, reset itself. The spring will then be recompressed between pedestal 246 and backup collar 260 with the spring retaining collar interposed therebetween.

Having thus described the principal components of the applicants' invention, its operation and advantages will now be reviewed. As viewed in FIG. 1, gauge assembly 32a is positioned at a relatively close distance from gauge mechanism 10 with its bumper mechanism lowered to an operative position in order to provide a barrier extending transversely across the back shear table 14. When so positioned, stock coming from the remote cooling beds along runoff table 12 will pass by the operative range of the shear mechanism and proceed along the back shear table until further forward motion is arrested by the bumper plate of gauge assembly 32a.

As each piece of stock strikes the bumper plate, the shock absorbing system comprised of interconnected coil springs and dashpots will absorb kinetic energy without damage resulting to the apparatus and without impairment of accurate stock alignment. It should also be noted that the bumper plate will move parallel to the back shear table components when deflected by the impact of shock. If positioned immediately in front of a table roller, the contour following mechanism will allow the bumper plate to follow the contour of the roll instead of being sharply driven thereagainst. When a sufficient number of stock pieces have been so accumulated and aligned, the shear mechanism will be actuated through a cutting cycle to sever a portion from each stock length. The length of each severed portion will be equal to the distance between the lowered bumper plate of gauge assembly 32a and the transverse path of the shear mechanism's cutting blade. Once the cutting cycle has been completed, the severed portions which in this case represent relatively short crop lengths, will subsequently be disposed of by any convenient means.

The bumper mechanism of gauge assembly 32a will then be raised to an inoperative position and the stock advanced along the back shear table to a point in engagement with the bumper plate of gauge assembly 32b. This having been accomplished, the shear mechanism will again be actuated to perform another cutting operation on the stock. The resulting severed portion of this second cutting cycle will have a length corresponding to the distance between shear mechanism 10 and the bumper plate of gauge assembly 32b.

Following the second cutting operation, the bumper mechanism of gauge assembly 32b will be raised to an inoperative position and the severed portions of greater length advanced along the back shear table until engaged by fixed stop 30. At this point, the severed portions will be transferred to an adjacent area where they will be tied into bundles and stored for subsequent shipment.

As previously indicated, either gauge assembly 32a or 32b may be displaced along the length of back shear table 14 by first disengaging the clamp mechanism associated therewith and thereafter energizing the traverse drive motors 86. Manual adjustments to the bumper plates are unnecessary when moving the gauge assemblies in view of the cam follower assemblies which automatically perform vertical adjustments to the bumper plates. Moreover, when a particular gauge assembly is positioned along the support beam at a point overlying an intermediate apron plate of the back shear table, the lower edge of its vertically adjustable bumper plate will be positioned in close proximity thereto. This will obviate the possibility of oncoming stock becoming wedged between the bumper plates and the apron plates.

It is our intention to cover all changes and modifications of the invention herein chosen for purposes of disclosure which do not depart from the spirit and scope of the invention.

We claim:

1. For use in a rolling mill with a back shear table extending along the mill floor from a stationary shear to a fixed end stop, said table provided with a plurality of rotatable transverse table rollers protruding slightly above intermediate apron plates, said table rollers being driven to provide a means of displacing stock on said table past said shear towards said end stop, gauge means for stopping and aligning the front ends of stock being carried by said rollers, said gauge means comprising the combination of: longitudinal support means overlying said table in parallel relationship thereto; a carriage assembly mounted on said support means for movement along the length thereof; stop means depending downwardly from said carriage assembly; cam means for constantly maintaining the lower edge of said stop means at a fixed predetermined distance from said apron plates and table rollers; drive means associated with said carriage assembly for imparting motion thereto along said support means in a direction towards or away from said stationary shear; and clamp means for holding said carriage assembly at any desired point on said support means.

2. The apparatus as set forth in claim 1 wherein said stop means is provided with a slidable faceplate, said cam means being operative to vertically adjust said faceplate as said carriage assembly is moved along said support means in order to maintain a constant space between the lower edge of the faceplate and the underlying apron plates and upwardly protruding table rollers.

3. The apparatus set forth in claim 2 wherein said cam means for vertically adjusting said faceplate is comprised of cam surfaces on said support means; a cam follower mounted on said carriage assembly to engage said cam surfaces as said carriage assembly is moved along said support means; and means for connecting said cam follower to said faceplate in order to slightly raise said faceplate through a distance equal to that which said table rollers protrude above said apron plates as said faceplate passes over each of said table rollers.

4. For use in a rolling mill with a back shear table extending along the mill floor from a stationary dividing shear to a fixed end stop, said table provided with a plurality of transversally disposed table rollers protruding slightly above intermediate apron plates, said table rollers being driven to provide a means of displacing stock along said table past said dividing shear towards said end stop, gauge means for stopping and aligning the front ends of stock being carried by said rollers, said gauge means comprising the combination of: a longitudinal support beam overlying said table and extending parallel thereto; a carriage assembly mounted on said support beam for movement along the length thereof; stock engaging stop means pivotally mounted on said carriage assembly; means for pivoting said stock engaging stop from an operative position extending transversely across the path of stock being carried by said table rollers to a raised position above said table; a faceplate slidably mounted on said stock engaging stop means; means for vertically adjusting said faceplate as the carriage assembly is moved along said supporting beam in order to maintain a constant space between the lower edge thereof and the underlying apron plates and table rollers; drive means associated with said carriage assembly for imparting motion thereto along the length of said support beam towards or away from said stationary shear; and clamp means for holding said carriage assembly at any desired point on said support beam.

5. For use in a rolling mill with a back shear table extending from a stationary shear to a fixed stop, said table provided with a plurality of driven stock supporting rollers protruding silghtly above intermediate apron plates, gauge means for stopping and aligning the front ends of stock being carried by said rollers, said gauge means comprising the combination of: continuous support means overlying the length of said table; a carriage assembly mounted on said support means for movement thereon in a direction parallel to said table; stock engaging stop means pivotally mounted on said carriage assembly; means for pivoting said stop means from a downwardly depending operative position extending across the path of stock being carried by said table rollers to an inoperative raised position above said table, said stop means further characterized by a slidable faceplate having cam means associated therewith for vertically adjusting said faceplate in order to maintain a constant space between the lower edge thereof and the underlying apron plates and table rollers as the carriage assembly is moved along said supporting means with the stock engaging stop means in a downwardly depending operative position, said cam means for vertically adjusting said faceplate including cam surfaces on said support means, cam follower means pivotally mounted on said carriage assembly to engage said cam surfaces as said carriage assembly is moved along said support means, and means for connecting said cam follower means to said faceplate in order to slightly raise said faceplate through a distance equal to that which the table rollers protrude above the apron plates as said faceplate passes over each said table roller; drive means associated with said carriage assembly for imparting movement thereto along said support means in a direction towards or away from said stationary shear; and clamp means for holding said carriage assembly at any desired point on said support means.

6. The apparatus as set forth in claim 5 wherein said drive means is comprised of a gear rack fixed to the underside of said support means to extend the length thereof, a pinion gear rotatably mounted on said carriage assembly for engagement with said rack, and means for driving said pinion gear in either a clockwise or counterclockwise direction in order to displace said carriage assembly along said support means in a direction towards or away from said stationary shear.

7. The apparatus as set forth in claim 5 further characterized by said clamp means being connected to said carriage assembly by intermediate shock absorbing means.

8. The apparatus as set forth in claim 7 wherein said shock absorbing means comprises the combination of: connecting shafts fixed at one end to said clamping means and slidably extending through passageways in said carriage assembly, the other ends of said shafts fixed to dashpots mounted on said carriage assembly, collars on said shafts fixed thereto by means of transversely extending shear pins; and spring means positioned between said collars and said carriage assembly for absorbing shocks imparted to the carriage assembly by the force of stock striking said faceplate, said springs compressed by said force with their subsequent expansion being retarded by the action of said dashpots on said connecting shafts.

9. For use in a rolling mill with a back shear table having positioned at one end a stationary shear and terminating at the other end in a fixed stop, said table provided with a plurality of driven stock supporting rollers protruding slightly above intermediate apron plates, gauge means for stopping and aligning the front ends of stock being carried by said rollers, said guage means comprising the combination of: longitudinal support means overlying said table and extending parallel thereto; a carriage assembly mounted on said support means for movement along the longitudinal axis thereof; stock engaging stop means pivotally mounted on said carriage assembly; means for pivoting said stock engaging stop means from a downwardly depending operative position obstructing the path of stock being carried by said table rollers to a raised inoperative position above said table, said stock engaging stop means further characterized by a slidable faceplate having cam means associated therewith for vertically adjusting said faceplate in order to maintain a constant space between the lower edge thereof and the underlying apron plates and table rollers as the carriage assembly is moved along said support means with said stock engaging stop means in a downwardly depending operative position; drive means associated with said carriage assembly for imparting movement thereto along the length of said support means in a direction towards or away from said stationary shear; clamp means for holding said carriage assembly at any desired point on said support means; and shock absorbing means for connecting said carriage assembly to said clamp means, said shock absorbing means comprising at least one connecting shaft fixed at one end to said clamp means and slidably extending through a passageway in said carriage assembly, the other end of said shaft fixed to a dashpot mounted on said carriage assembly, a first collar on said shaft fixed thereto by means of a transversely extending shear pin, spring means positioned between said first collar and said carriage assembly for absorbing shocks imparted to the carriage assembly by the force of stock striking said faceplate, said spring compressed by said force with its subsequent expansion being retarded by the action of said dashpot on said connecting shaft, and means for reactivating said shock absorber in the event that said shear pin is sheared by excessive forces being exerted by stock on said faceplate.

10. The apparatus as set forth in claim 9 wherein said means for reactivating said shock absorber is comprised of a second collar fixed to said connecting shaft and spaced from said first collar, said second collar acting to retain said spring in the event that the force imparted by stock on said faceplate is of sufficient magnitude to shear said shear pin.

References Cited by the Examiner

UNITED STATES PATENTS

| | | | |
|---|---|---|---|
| 1,012,805 | 12/1911 | Bryen | 83—467 |
| 1,125,395 | 1/1915 | Recconi | 269—82 |
| 1,142,974 | 6/1915 | Leonhouser | 83—391 |
| 1,337,464 | 4/1920 | O'Brein | 83—391 |
| 1,815,699 | 7/1931 | Bonsor | 83—467 X |
| 1,900,933 | 3/1933 | Hudson | 83—391 |
| 2,262,599 | 11/1941 | Bolz | 269—320 |
| 2,360,752 | 10/1944 | Zuber | 83—391 |
| 2,446,146 | 6/1948 | Tucker | 83—391 |
| 2,472,083 | 6/1949 | Bartholdy | 269—82 |
| 2,999,409 | 9/1961 | Gollwitzer | 83—467 X |

WILLIAM W. DYER, JR., *Primary Examiner.*